US012731928B2

(12) United States Patent
Wang et al.

(10) Patent No.: US 12,731,928 B2
(45) Date of Patent: Sep. 8, 2026

(54) ELECTRONIC DEVICE

(71) Applicant: Acer Incorporated, New Taipei City (TW)

(72) Inventors: Dong-Yu Wang, New Taipei City (TW); Chun-Hung Wen, New Taipei City (TW); An-Cheng Lee, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 294 days.

(21) Appl. No.: 18/463,258

(22) Filed: Sep. 7, 2023

(65) Prior Publication Data

US 2025/0015525 A1 Jan. 9, 2025

(30) Foreign Application Priority Data

Jul. 6, 2023 (TW) ................................ 112125348

(51) Int. Cl.
*H01R 12/91* (2011.01)
*H01R 12/70* (2011.01)
*H01R 13/502* (2006.01)

(52) U.S. Cl.
CPC ......... *H01R 12/91* (2013.01); *H01R 12/7058* (2013.01); *H01R 13/502* (2013.01); *H01R 2201/06* (2013.01)

(58) Field of Classification Search
CPC .. H01R 12/91; H01R 12/7058; H01R 13/502; H01R 2201/06; H01R 12/7005; G06F 13/409; G06F 1/182; G06F 1/1656; H05K 2201/09063; H05K 2201/10189; H05K 1/02; H05K 2201/10446
See application file for complete search history.

(56) References Cited

U.S. PATENT DOCUMENTS

| | | | | |
|---|---|---|---|---|
| 6,077,100 | A * | 6/2000 | Sakano | H01R 13/62905 439/157 |
| 6,135,786 | A * | 10/2000 | Johnson | H01R 31/065 439/946 |
| 9,099,823 | B2 | 8/2015 | Lai | |
| 9,184,536 | B2 * | 11/2015 | Senatori | H01R 13/62 |
| 2011/0147036 | A1 * | 6/2011 | Cheng | G06F 1/1656 174/59 |
| 2017/0264041 | A1 * | 9/2017 | Senatori | H01R 13/62905 |
| 2025/0015525 | A1 * | 1/2025 | Wang | H01R 13/502 |
| 2025/0192476 | A1 * | 6/2025 | Wang | H01R 24/20 |

FOREIGN PATENT DOCUMENTS

| | | |
|---|---|---|
| CN | 103582980 | 11/2015 |
| JP | 6264219 | 1/2018 |
| TW | I501069 | 9/2015 |

* cited by examiner

*Primary Examiner* — Abdullah A Riyami
*Assistant Examiner* — Nader J Alhawamdeh
(74) *Attorney, Agent, or Firm* — JCIPRNET

(57) ABSTRACT

An electronic device including a body and a female connector is disclosed. The body has an opening and a positioning structure disposed corresponding to the opening. The female connector is disposed in the body corresponding to the opening and is pivotally connected to the positioning structure. A male connector is adapted to pass through the opening and plugged into the female connector, and the female connector is adapted to be driven by the male connector to rotate around a rotation axis passing through the positioning structure.

10 Claims, 11 Drawing Sheets

ELECTRONIC DEVICE

CROSS-REFERENCE TO RELATED APPLICATION

This application claims the priority benefit of Taiwan application serial no. 112125348, filed on Jul. 6, 2023. The entirety of the above-mentioned patent application is hereby incorporated by reference herein and made a part of this specification.

BACKGROUND

Technical Field

This disclosure relates to an electronic device.

Description of Related Art

Most common electronic devices (e.g., laptop computers, tablet computers, smart phones, or servers) are equipped with female connectors for male connectors to be plugged in to transmit power or signals. Generally, the female connector is fixed inside the body of the electronic device, and during the process of plugging and unplugging the male connector, the user needs to repeatedly check the direction of plugging and unplugging, otherwise the male connector and the female connector may be damaged due to pushing, pulling, or collision.

SUMMARY

The disclosure provides an electronic device that not only facilitates user operation, but also prevents damage to a female connector.

The disclosure proposes an electronic device including a body and a female connector. The body has an opening and a positioning structure disposed corresponding to the opening. The female connector is disposed in the body corresponding to the opening, and is pivotally connected to the positioning structure. The male connector is adapted to pass through the opening and plugged into the female connector, and the female connector is adapted to be driven by the male connector to rotate around the rotation axis passing through the positioning structure.

Based on the above, in the electronic device of the disclosure, the female connector is rotatably disposed inside the body. Therefore, during a process of plugging and unplugging the male connector, the female connector may be driven by the male connector to rotate moderately. Without repeatedly checking a direction of plugging and unplugging, the user may plug in, unplug, obliquely plug or obliquely unplug the male connector at will, which not only improves the convenience of operation, but also avoids damage to the male connector and the female connector due to pushing, pulling or collision.

To make the aforementioned more comprehensive, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
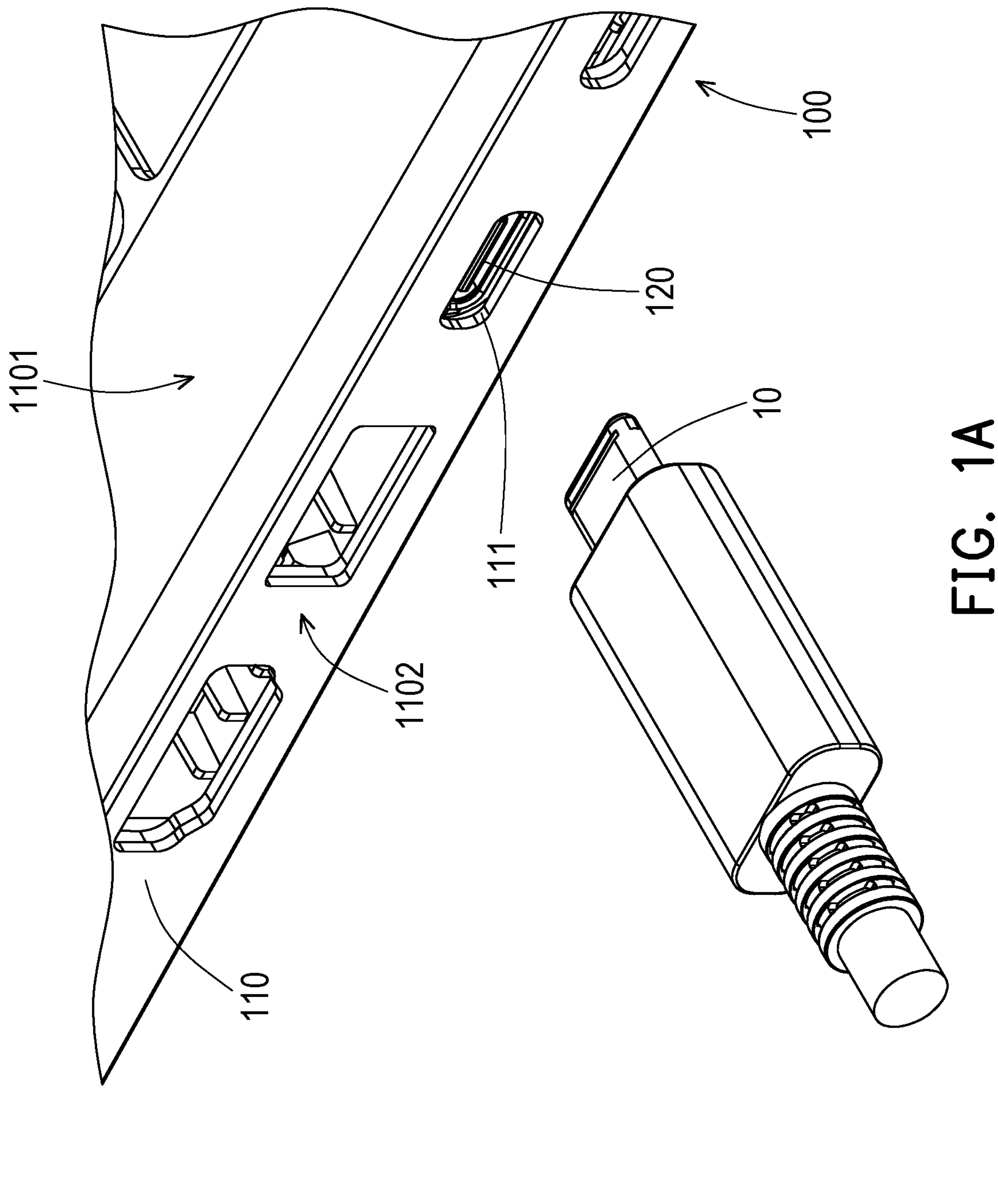
FIG. 1A and FIG. 1B are schematic views of a plugging process of an electronic device and a male connector of according to an embodiment of the disclosure.
Figure 1B:
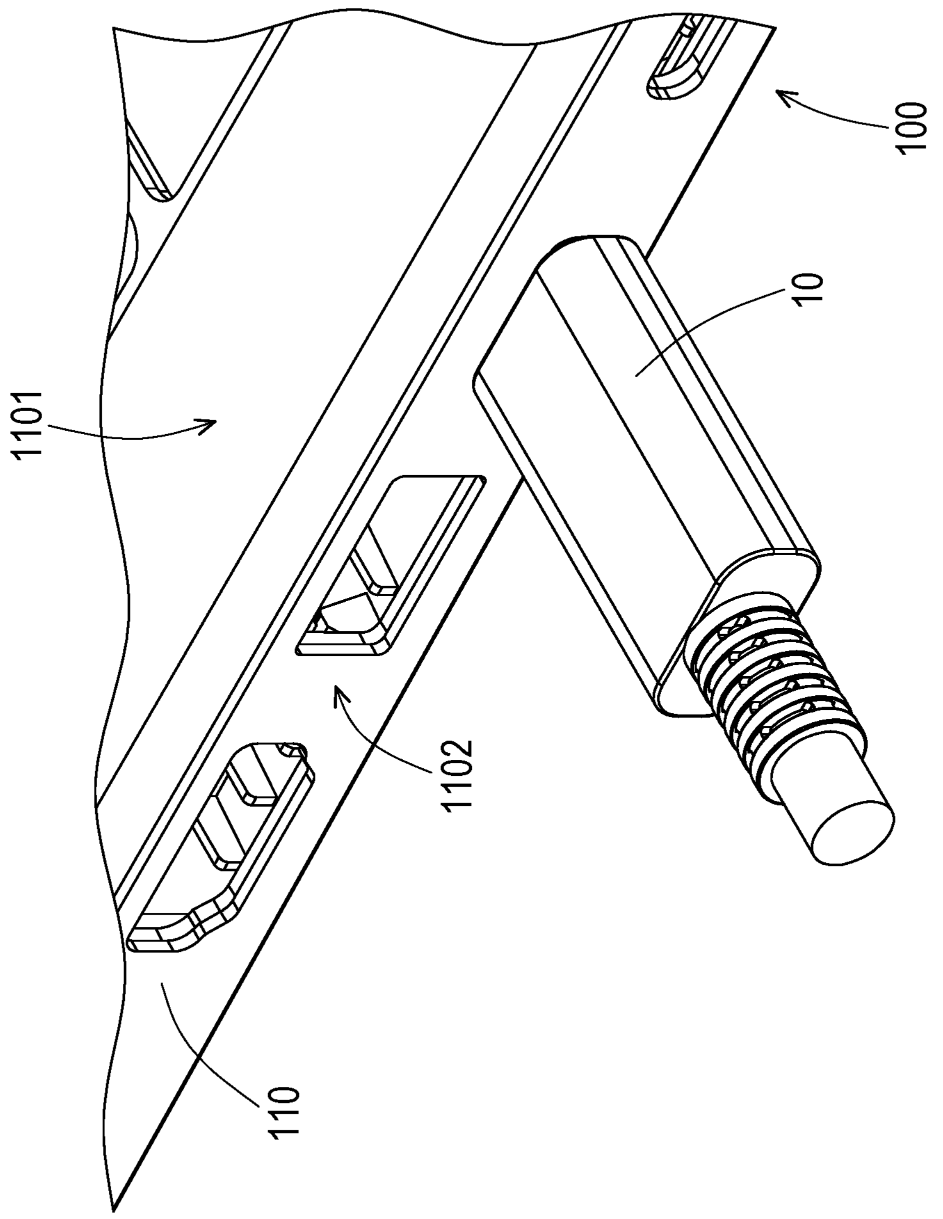

FIG. 1A and FIG. 1B are schematic views of a plugging process of an electronic device and a male connector of according to an embodiment of the disclosure. Referring to FIG. 1A and FIG. 1B, in this embodiment, an electronic device 100 may be a portion of a laptop computer, a tablet computer, a smart phone, a server, or other electronic devices. Specifically, the electronic device 100 includes a body 110 and a female connector 120 disposed in the body 110, and the body 110 is provided with an opening 111 corresponding to the female connector 120, so that a male connector 10 may pass through and be plugged into the female connector 120 for transmission of power or signals. For example, transmission specifications of the male connector 10 and the female connector 120 may be Type-A, Type-B or Type-C, but not limited thereto.

Referring to FIG. 1A and FIG. 1B, the body 110 also has a first surface 1101 and a second surface 1102 where the opening 111 is located, and the second surface 1102 is connected to the first surface 1101. For example, the first surface 1101 may be a top surface, a bottom surface, a display surface, or an operating surface where a keyboard is located, and the second surface 1102 may be a side surface.

Figure 1C:
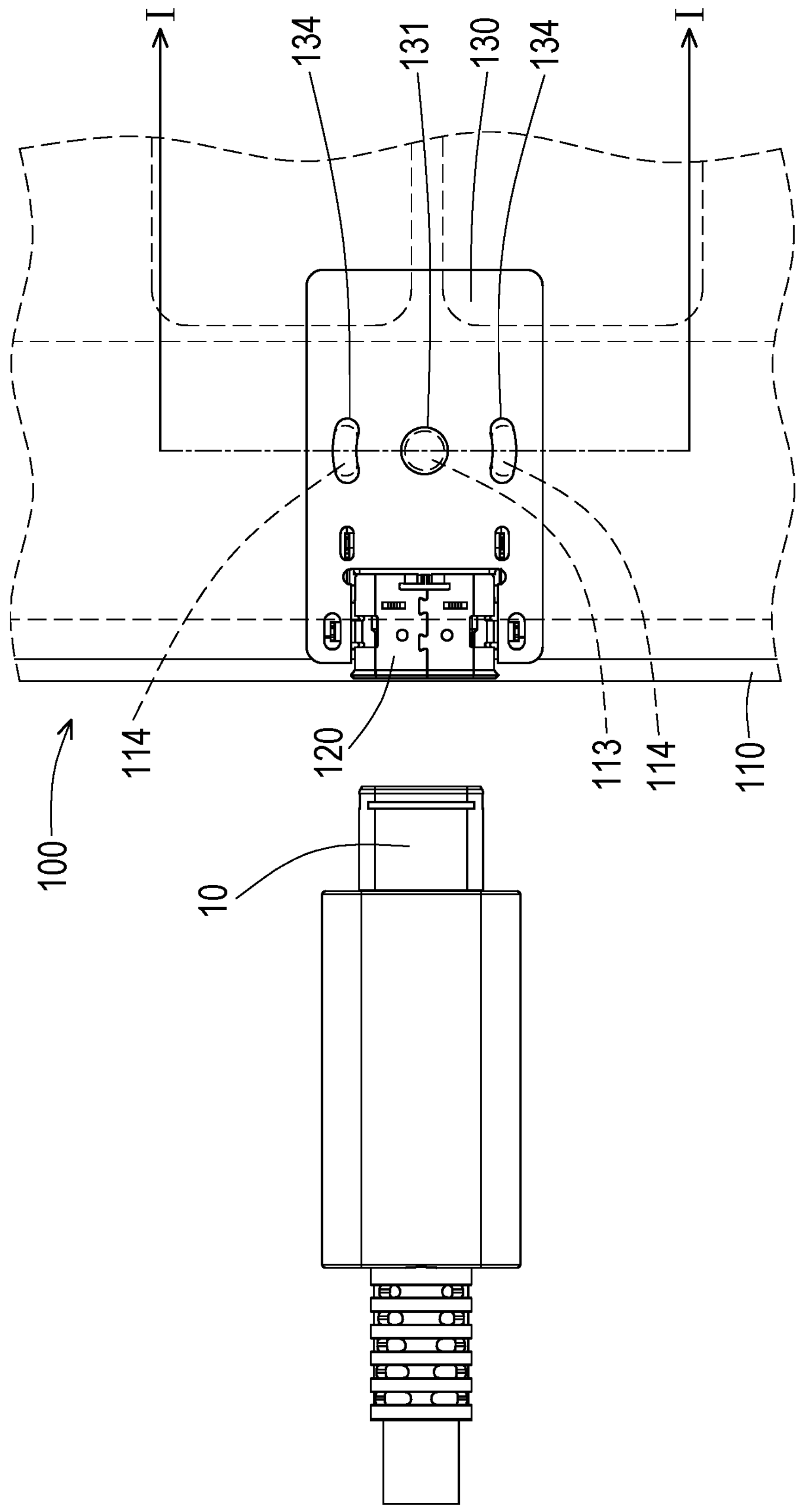
FIG. 1C is a schematic top view of FIG. 1A.
Figure 1D:
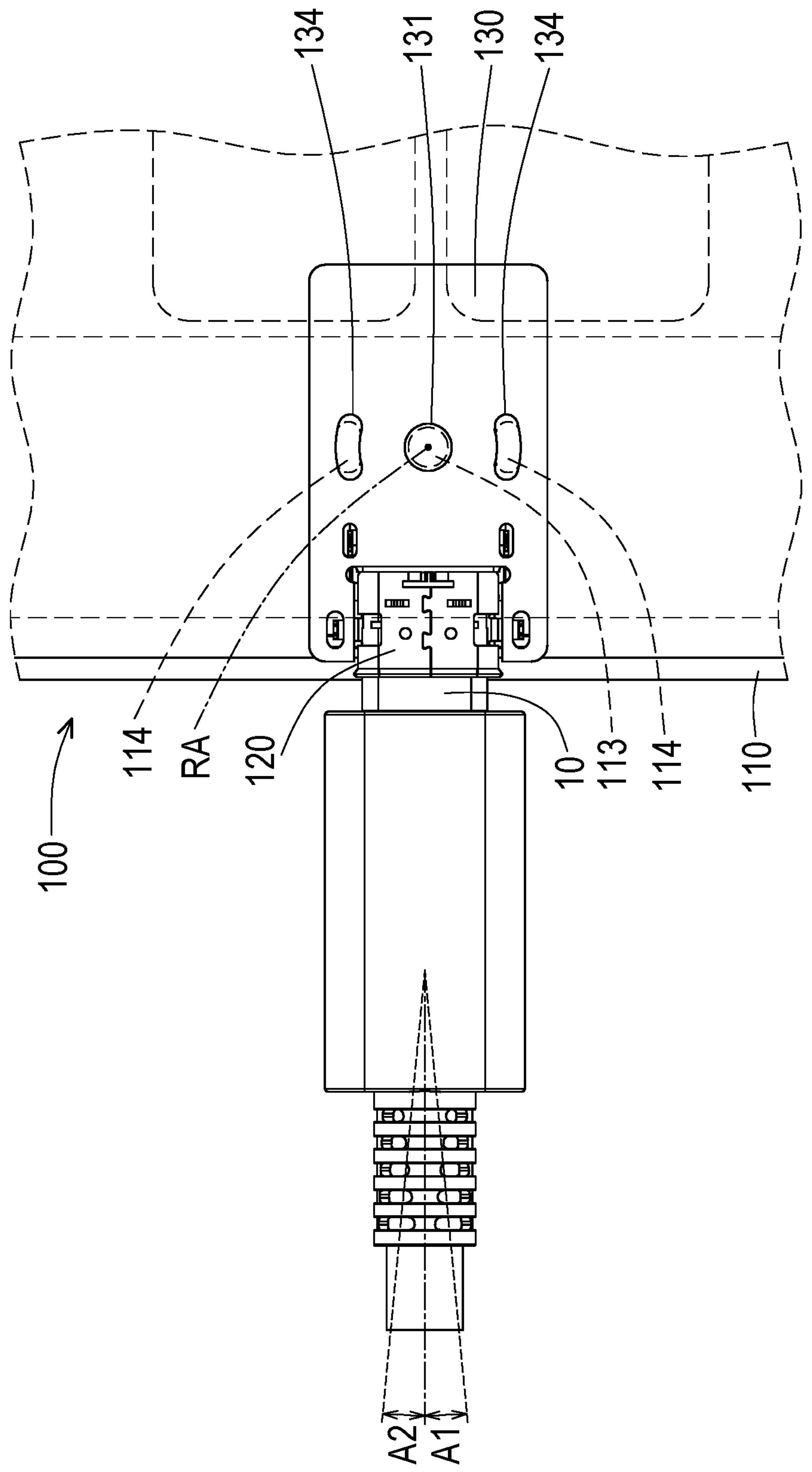
FIG. 1D is a schematic top view of FIG. 1B.
Figure 1E:
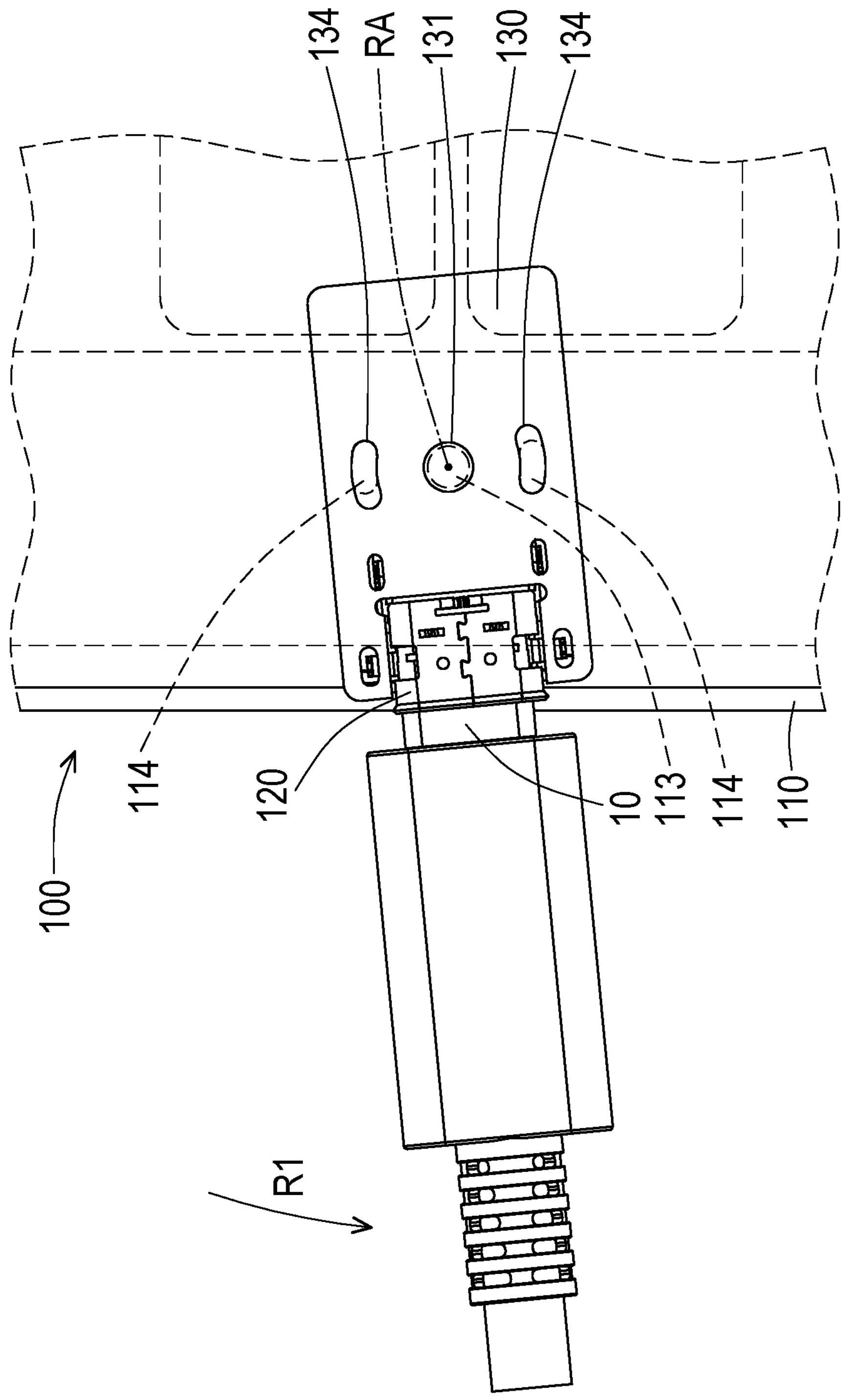
FIG. 1E and FIG. 1F are schematic top views of a female connector in FIG. 1D rotating in two different rotational directions.
Figure 1F:
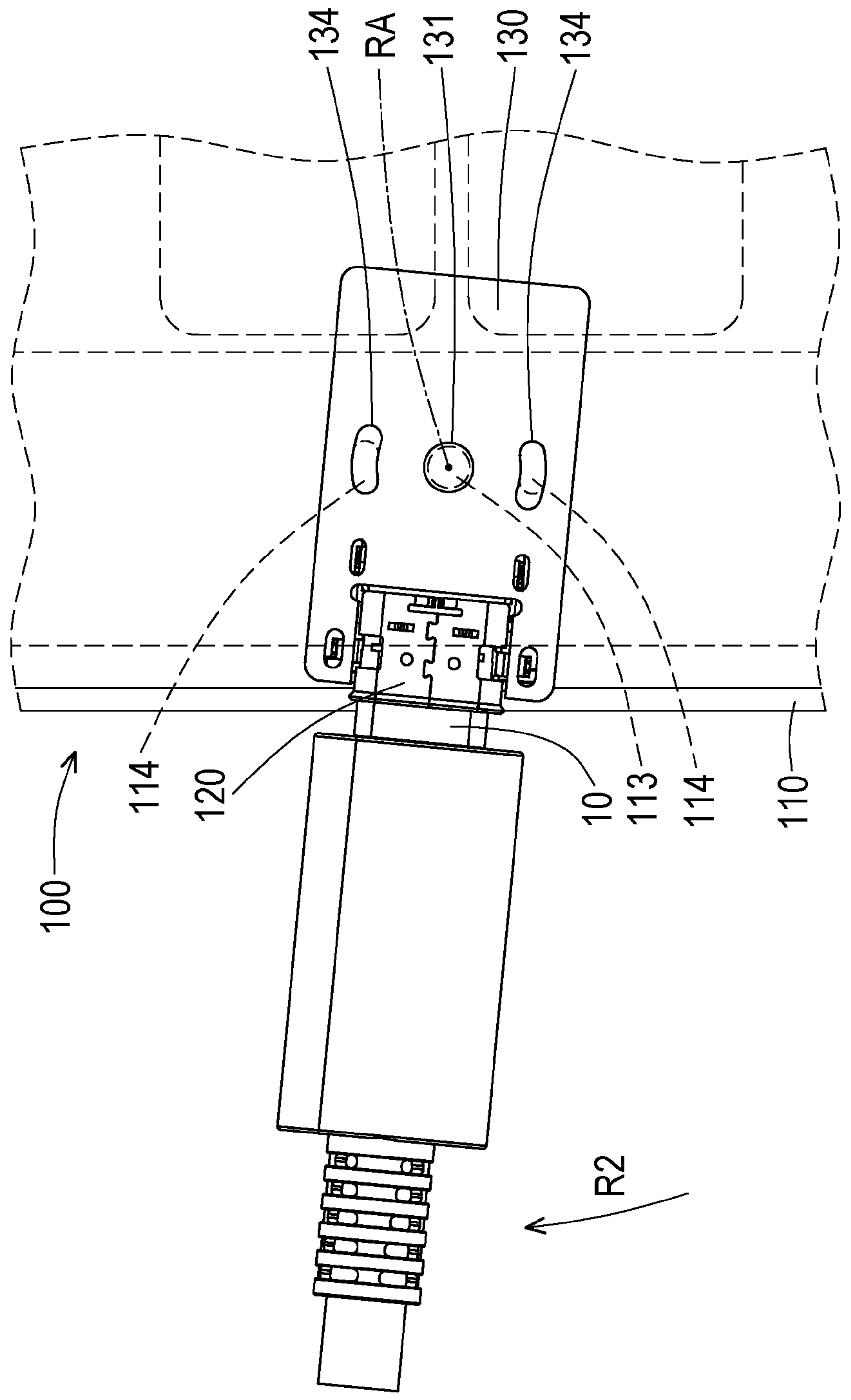

FIG. 1C is a schematic top view of FIG. 1A. FIG. 1D is a schematic top view of FIG. 1B. FIG. 1E and FIG. 1F are schematic top views of a female connector in FIG. 1D rotating in two different rotational directions. In order to clearly present the internal structural configuration, parts of the body 110 are shown as dashed lines in FIG. 1C to FIG. 1F. As shown in FIG. 1A and FIG. 1C, the body 110 further has a positioning structure 113 disposed corresponding to the opening 111, and the female connector 120 is pivotally connected to the positioning structure 113. As shown in FIG. 1D to FIG. 1F, as the user plugs or unplugs the male connector 10 into or from the female connector 120, the female connector 120 may remain stationary or rotate moderately around a rotation axis RA passing through the positioning structure 113, depending on the direction of the user's application of force on the male connector 10.

That is, during a process of plugging and unplugging the male connector 10, the female connector 120 may be driven by the male connector 10 to rotate moderately. Therefore, the user does not need to repeatedly check a direction of plugging and unplugging, and may plug in, unplug, obliquely plug or obliquely unplug the male connector at will, which not only improves the convenience of operation, but also avoids damage to the male connector 10 and the female connector 120 due to pushing, pulling or collision.

Figure 1G:
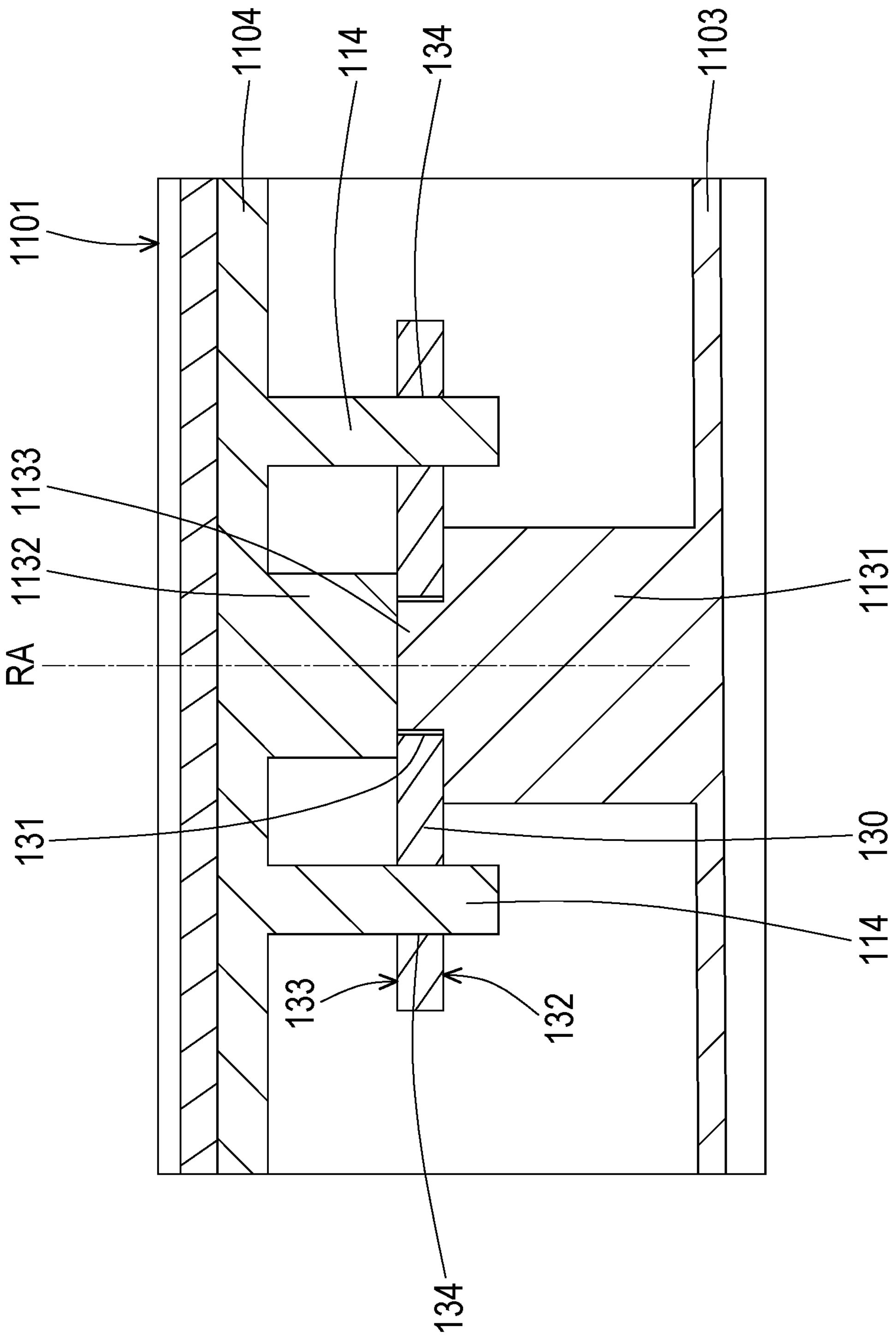
FIG. 1G is a schematic cross-sectional view of FIG. 1C along a section line I-I.

FIG. 1G is a schematic cross-sectional view of FIG. 1C along a section line I-I. As shown in FIG. 1A, FIG. 1B, and FIG. 1G, the rotation axis RA is perpendicular to the first surface 1101 and also perpendicular to the direction of plugging and unplugging of the male connector 10. As shown in FIG. 1D to FIG. 1F, the electronic device 100 further includes a circuit board 130 disposed in the body 110, where the female connector 120 is fixed on the circuit board 130 and pivotally connected to the positioning structure 113 through the circuit board 130. In addition, the female connector 120 is electrically connected to the circuit board 130, and is electrically connected to a main board (not shown in the figure) through the circuit board 130.

As shown in FIG. 1D and FIG. 1G, the circuit board 130 has a positioning through hole 131, where the rotation axis RA passes through the positioning through hole 131, and the positioning through hole 131 is sleeved on the positioning structure 113. Further, the body 110 includes a first casing 1103 and a second casing 1104 installed on the first casing 1103, and the positioning structure 113 includes a first positioning post 1131 and a second positioning post 1132. The first positioning post 1131 is located on the first casing 1103 and protrudes toward the second positioning post 1132. In addition, the second positioning post 1132 is located on the second casing 1104 and protrudes toward the first positioning post 1131.

The positioning through hole 131 of the circuit board 130 is sleeved on the first positioning post 1131, and the circuit board 130 is positioned between the first positioning post 1131 and the second positioning post 1132 disposed in alignment with the first positioning post 1131. That is, the female connector 120 and the circuit board 130 may be positioned in the body 110 by the first positioning post 1131 and the second positioning post 1132 and rotate relative to the first positioning post 1131 and the second positioning post 1132.

As shown in FIG. 1G, the circuit board 130 further has a bottom surface 132 and a top surface 133 opposite to the bottom surface 132, and the positioning through hole 131 penetrates the bottom surface 132 and the top surface 133. Further, the first positioning post 1131 protruding toward the second positioning post 1132 contacts the bottom surface 132, and relatively, the second positioning post 1132 protruding toward the first positioning post 1131 contacts the top surface 133. That is, the circuit board 130 is rotatably clamped between the first positioning post 1131 and the second positioning post 1132, and is suspended between the first casing 1103 and the second casing 1104 supported by the first positioning post 1131.

On the other hand, the first positioning post 1131 has a positioning protrusion 1133 protruding toward the second positioning post 1132. The positioning protrusion 1133 is inserted into the positioning through hole 131, and the second positioning post 1132 covers a side of the positioning through hole 131 to be in contact with the positioning protrusion 1133. That is, the female connector 120 and the circuit board 130 substantially rotate around the positioning protrusion 1133, and the rotation axis RA passes through the positioning protrusion 1133.

As shown in FIG. 1D and FIG. 1E, the female connector 120 and the circuit board 130 may be driven by the male connector 10 to rotate around the rotation axis RA within a first angle A1 in a first rotational direction R1, e.g., to create a swing between a stationary neutral position and a first yaw position. As shown in FIG. 1D and FIG. 1F, the female connector 120 and the circuit board 130 may be driven by the male connector 10 to rotate around the rotation axis RA within a second angle A2 in a second rotational direction R2, e.g., to create a swing between a stationary neutral position and a second yaw position.

As shown in FIG. 1D to FIG. 1F, the second rotational direction R2 is opposite to the first rotational direction R1, and the first angle A1 is equal to the second angle A2, e.g., 5 degrees, but not limited thereto. In addition, based on the neutral position, the first yaw position is symmetrical to the second yaw position.

As shown in FIG. 1D to FIG. 1G, the circuit board 130 further has two arc-shaped limiting grooves 134, and the two arc-shaped limiting grooves 134 are symmetrically disposed on opposite sides of the rotation axis RA. In addition, the body 110 further has two arc-shaped limiting portions 114, and the two arc-shaped limiting portions 114 are slidably disposed in the two arc-shaped limiting grooves 134, respectively. The two arc-shaped limiting portions 114 protrude from the second casing 1104 to the circuit board 130, and are respectively inserted into the two arc-shaped limiting grooves 134.

As shown in FIG. 1D to FIG. 1F, curvature centers of the two arc-shaped limiting grooves 134 fall on the rotation axis RA, and through sliding coordination of the two arc-shaped limiting grooves 134 and the corresponding arc-shaped limiting portions 114, the female connector 120 and the circuit board 130 may be rotated within a limited angular range (e.g., a sum of the first angle A1 and the second angle A2), to avoid the female connector 120 and the circuit board 130 from generating too large of swinging, which would cause obstruction to the plugging and unplugging of the male connector 10.

It should be noted that each arc-shaped limiting groove 134 and the corresponding arc-shaped limiting portion 114 may be formed into a rotation angle limiting structure, and although the geometrical contour of the rotation angle limiting structure of this embodiment is illustrated in the form of an arc, it is not limited thereto.

Figure 2:
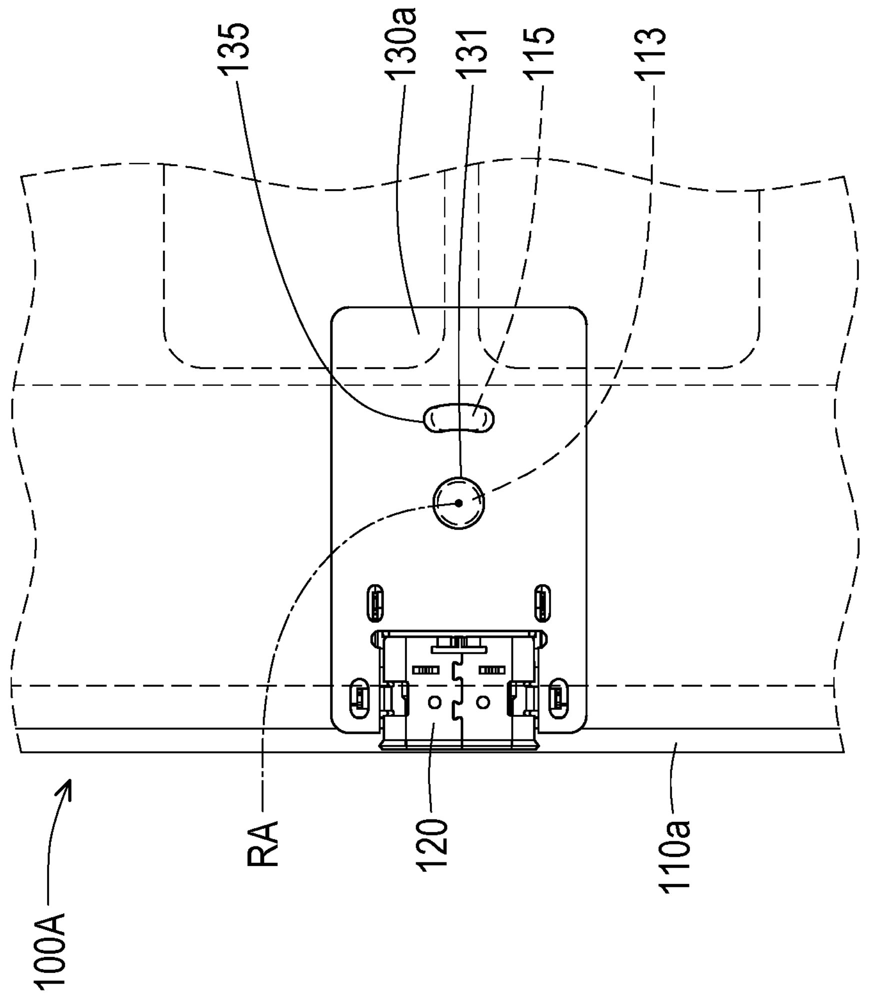
FIG. 2 to FIG. 5 are schematic top views of electronic devices according to other embodiments of the disclosure.

FIG. 2 to FIG. 5 are schematic top views of electronic devices according to other embodiments of the disclosure. In order to clearly present the internal structural configuration, portions of bodies 110*a* to 110*d* are shown as dashed lines in FIG. 2 to FIG. 5, respectively. Referring to FIG. 2, the design of an electronic device 100A of this embodiment is substantially the same as the design of the electronic device 100 of the above-mentioned embodiment. The main difference between the two is that a circuit board 130*a* is provided with an arc-shaped limiting groove 135, and the female connector 120 and the arc-shaped limiting groove 135 are respectively located on opposite sides of the rotation axis RA. In addition, the body 110*a* is provided with an arc-shaped limiting portion 115, and the arc-shaped limiting portion 115 is slidably disposed in the arc-shaped limiting groove 135. A curvature center of the arc-shaped limiting groove 135 falls on the rotation axis RA, and through sliding coordination between the arc-shaped limiting groove 135 and the arc-shaped limiting portion 115, the female connector 120 and the circuit board 130*a* may rotate within a limited angular range.

It should be noted that the arc-shaped limiting groove 135 and the arc-shaped limiting portion 115 may be formed into a rotation angle limiting structure, and although the geometrical contour of the rotation angle limiting structure of this embodiment is illustrated in the form of an arc, it is not limited thereto.

Figure 3:
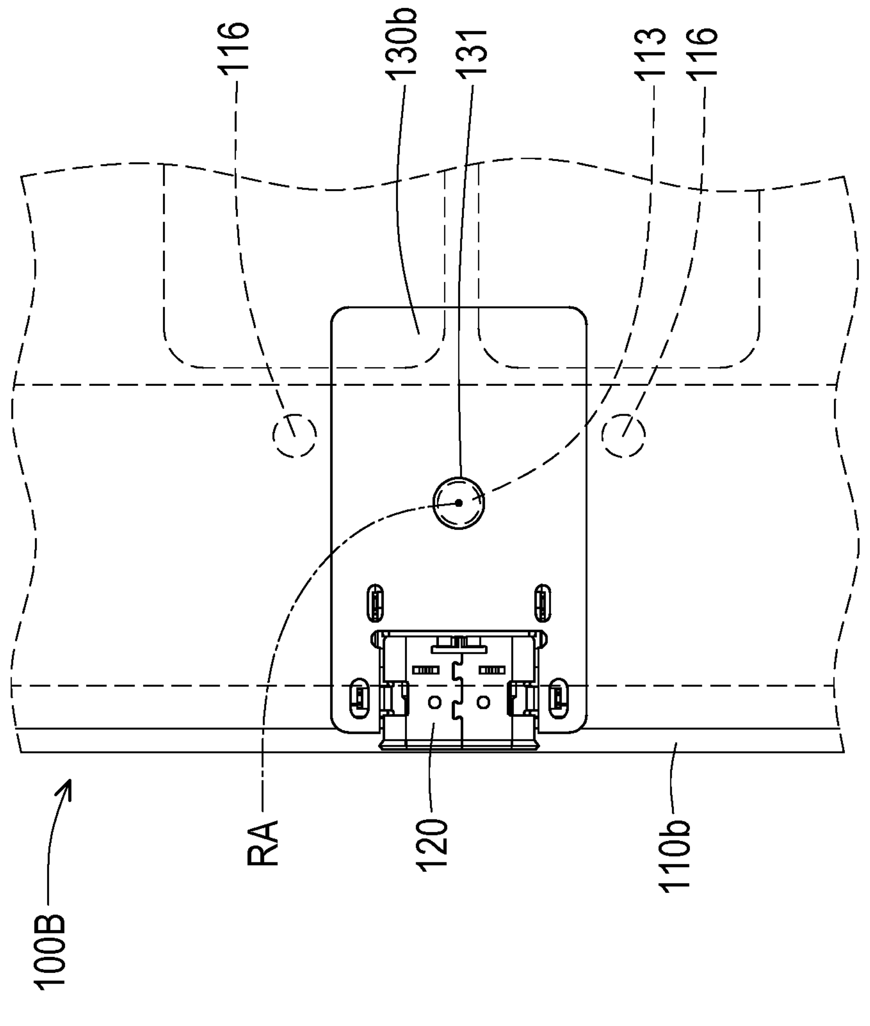

Referring to FIG. 3, the design of an electronic device 100B of this embodiment is substantially the same as the design of the electronic device 100 of the above-mentioned embodiment. The main difference between the two is that a circuit board 130*b* is not provided with an arc-shaped limiting groove, and a body 110*b* is provided with two opposite limiting portions 116 on a rotation path of the circuit board 130*b*. Furthermore, the two limiting portions 116 are symmetrically disposed on opposite sides of the rotation axis RA, and are configured to limit a swing range of the circuit board 130*b* in the two rotational directions that are opposite to each other.

Figure 4:
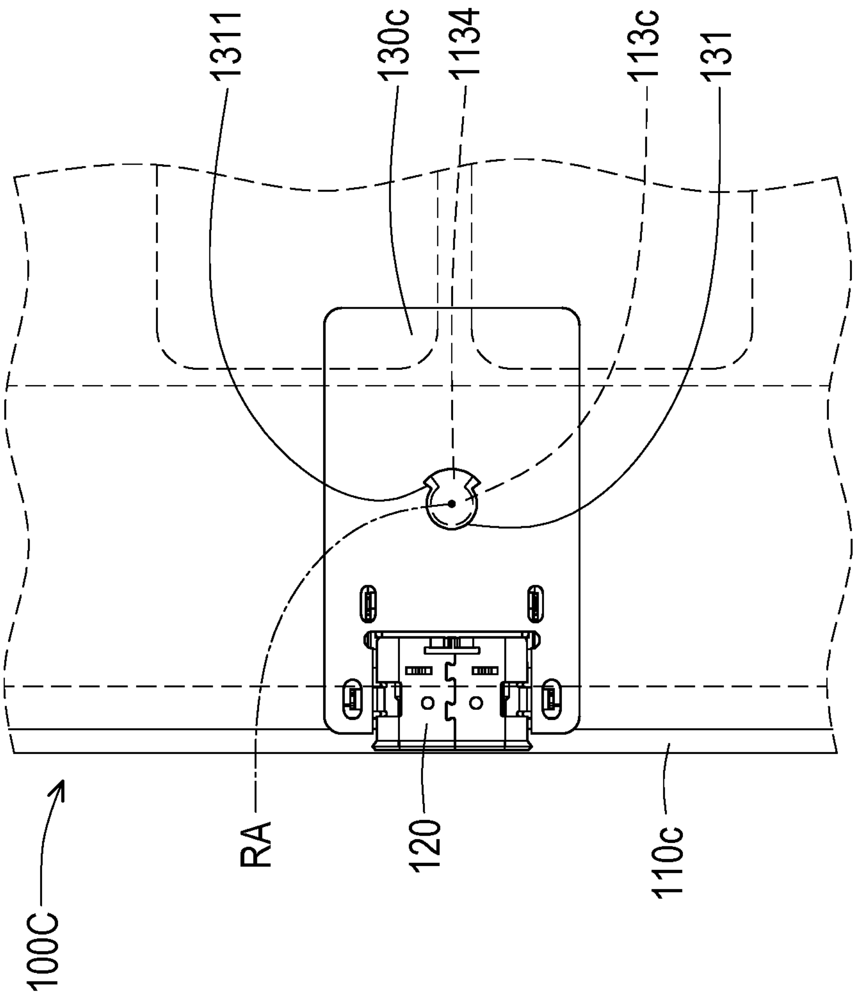

Referring to FIG. 4, the design of an electronic device 100C of this embodiment is substantially the same as the design of the electronic device 100 of the above-mentioned embodiment. The main difference between the two is that a circuit board 130*c* is not provided with an arc-shaped limiting groove, but is provided with an arc-shaped groove 1311 connected to the positioning through hole 131. Further, the female connector 120 and the arc-shaped groove 1311 are respectively located on opposite sides of the rotation axis RA, and a positioning structure 113*c* is provided with an arc-shaped protrusion 1134 slidingly disposed in the arc-shaped groove 1311. A curvature center of the arc-shaped groove 1311 falls on the rotation axis RA, and through sliding coordination between the arc-shaped protrusion 1312 and the arc-shaped groove 1135, the female connector 120 and the circuit board 130*a* may rotate within a limited angular range.

It should be noted that the arc-shaped groove 1311 and the arc-shaped protrusion 1134 may be formed into a rotation angle limiting structure, and although the geometrical contour of the rotation angle limiting structure of this embodiment is illustrated in the form of an arc, it is not limited thereto.

Figure 5:
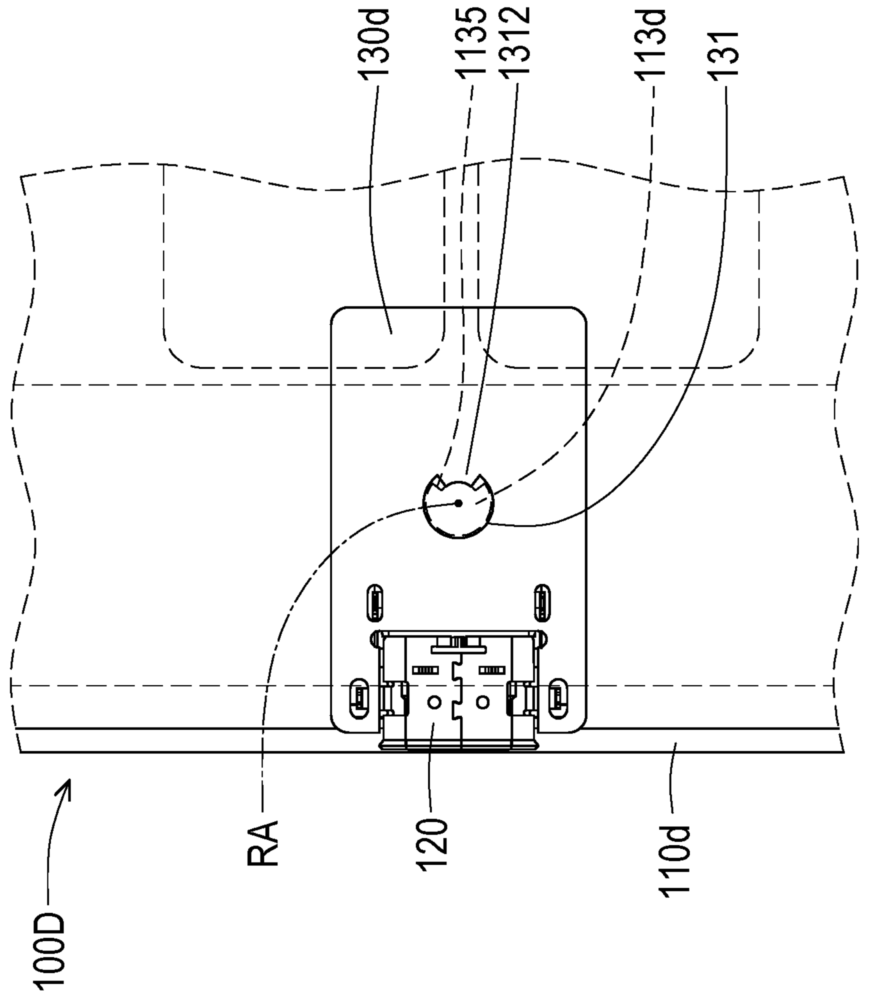

Referring to FIG. 5, the design of an electronic device 100D of this embodiment is substantially the same as the design of the electronic device 100 of the above-mentioned embodiment. The main difference between the two is that a circuit board 130*d* is not provided with an arc-shaped limiting groove, but is provided with an arc-shaped protrusion 1312 located in the positioning through hole 131. Further, the female connector 120 and the arc-shaped protrusion 1312 are respectively located on opposite sides of the rotation axis RA, and the positioning structure 113*d* is provided with an arc-shaped groove 1135, and the arc-shaped protrusion 1312 is slidably disposed in the arc-shaped groove 1135. A curvature center of the arc-shaped groove 1135 falls on the rotation axis RA, and the female connector 120 and the circuit board 130*d* can rotate within a limited angle range through the sliding fit between the arc-shaped protrusion 1312 and the arc-shaped groove 1135.

It should be noted that the arc-shaped groove 1135 and the arc-shaped protrusion 1312 may be formed into a rotation angle limiting structure, and although the geometrical contour of the rotation angle limiting structure of this embodiment is illustrated in the form of an arc, it is not limited thereto.

To sum up, in the electronic device of the disclosure, the female connector is rotatably disposed inside the body. Therefore, during a process of plugging and unplugging the male connector, the female connector may be driven by the male connector to rotate moderately. Without repeatedly checking a direction of plugging and unplugging, the user may plug in, unplug, obliquely plug or obliquely unplug the male connector at will, which not only improves the convenience of operation, but also avoids damage to the male connector and the female connector due to pushing, pulling or collision.

It will be apparent to those skilled in the art that various modifications and variations can be made to the disclosed embodiments without departing from the scope or spirit of the disclosure. In view of the forthcoming, it is intended that the disclosure covers modifications and variations provided that they fall within the scope of the following claims and their equivalents.

What is claimed is:

1. An electronic device comprising:

a body having an opening and a positioning structure disposed corresponding to the opening, wherein the body comprises a first casing and a second casing installed on the first casing, and the positioning structure comprises a first positioning post on the first casing and a second positioning post on the second casing;

a female connector disposed in the body corresponding to the opening and pivotally connected to the positioning structure, a male connector adapted to pass through the opening and plugged into the female connector, and the female connector adapted to be driven by the male connector to rotate around a rotation axis passing through the positioning structure; and a circuit board disposed in the body, wherein the female connector is fixed on the circuit board and the circuit board is pivotally connected to the positioning structure, wherein the female connector and the circuit board are adapted to be driven by the male connector to rotate around the rotation axis simultaneously, wherein the circuit board has a bottom surface, a top surface opposite to the bottom surface, and a positioning through hole penetrating the bottom surface and the top surface, the rotation axis passes through the positioning through hole, and the positioning through hole is sleeved on the first positioning post, wherein the first positioning post is disposed in alignment with the second positioning post, and the circuit board is positioned between the first positioning post and the second positioning post, the first positioning post contacts the bottom surface, and the second positioning post contacts the top surface.

2. The electronic device according to claim 1, wherein the body further has a first surface and a second surface connected to the first surface, the rotation axis is perpendicular to the first surface, and the opening is located on the second surface.

3. The electronic device according to claim 1, wherein the first positioning post has a positioning protrusion inserted into the positioning through hole, and the second positioning post covers a side of the positioning through hole to be in contact with the positioning protrusion.

4. The electronic device according to claim 1, wherein the circuit board has two arc-shaped limiting grooves, the two arc-shaped limiting grooves are symmetrically disposed on opposite sides of the rotation axis, the body further has two arc-shaped limiting portions, and the two arc-shaped limiting portions are slidably disposed in the two arc-shaped limiting grooves, respectively.

5. The electronic device according to claim 1, wherein the circuit board has an arc-shaped limiting groove, the female connector and the arc-shaped limiting groove are respectively located on opposite sides of the rotation axis, the body further has an arc-shaped limiting portion, and the arc-shaped limiting portion is slidably disposed in the arc-shaped limiting groove.

6. The electronic device according to claim 1, wherein the body further has two limiting portions, the two limiting portions are symmetrically disposed on opposite sides of the rotation axis, and the two limiting portions are located on a rotation path of the circuit board.

7. The electronic device according to claim 1, wherein the circuit board further has an arc-shaped groove connected to the positioning through hole, the female connector and the arc-shaped groove are respectively located on opposite sides of the rotation axis, the positioning structure has an arc-shaped protrusion, and the arc-shaped protrusion is slidably disposed in the arc-shaped groove.

8. The electronic device according to claim 1, wherein the circuit board further has an arc-shaped protrusion located in the positioning through hole, the female connector and the arc-shaped protrusion are respectively located on opposite sides of the rotation axis, the positioning structure has an arc-shaped groove, and the arc-shaped protrusion is slidably disposed in the arc-shaped groove.

9. The electronic device according to claim 1, wherein the female connector is adapted to be driven by the male connector to rotate around the rotation axis within a first angle in a first rotational direction or within a second angle in a second rotational direction opposite to the first rotational direction.

10. The electronic device according to claim 9, wherein the first angle is equal to the second angle.

* * * * *